US007457943B2

(12) United States Patent
Hiramatsu et al.

(10) Patent No.: US 7,457,943 B2
(45) Date of Patent: Nov. 25, 2008

(54) CONTROLLER, IMAGE PROCESSING APPARATUS, AND METHOD OF CONTROLLING EXECUTION OF PROGRAM

(75) Inventors: Hisaji Hiramatsu, Kanagawa (JP); Tetsuya Toi, Kawagawa (JP); Yasunao Unno, Kanagawa (JP); Kazuya Obinata, Kanagawa (JP); Minoru Kashibe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 743 days.

(21) Appl. No.: 10/862,472

(22) Filed: Jun. 8, 2004

(65) Prior Publication Data

US 2005/0050360 A1 Mar. 3, 2005

(30) Foreign Application Priority Data

Jun. 12, 2003 (JP) ............................ 2003-168524

(51) Int. Cl.
*G06F 9/00* (2006.01)

(52) U.S. Cl. .............................. 713/1; 713/2; 713/300; 713/310; 713/320; 713/321; 713/322; 713/323; 713/324; 713/330; 713/340

(58) Field of Classification Search ..................... 713/1, 713/2, 300, 310, 320–324, 330, 340
See application file for complete search history.

(56) References Cited

U.S. PATENT DOCUMENTS

| | | | | | |
|---|---|---|---|---|---|
| 6,016,547 | A | * | 1/2000 | Ono | 713/300 |
| 6,154,837 | A | * | 11/2000 | Fudeyasu et al. | 713/2 |
| 6,243,837 | B1 | * | 6/2001 | Zimmermann et al. | 714/51 |
| 6,345,350 | B2 | * | 2/2002 | Maruyama et al. | 711/202 |
| 6,762,780 | B2 | * | 7/2004 | Tsuruta et al. | 347/171 |
| 6,903,830 | B1 | * | 6/2005 | Hane et al. | 358/1.13 |
| 7,174,483 | B2 | * | 2/2007 | Becher et al. | 714/55 |

FOREIGN PATENT DOCUMENTS

| | | | |
|---|---|---|---|
| JP | A 2000-326590 | | 11/2000 |
| JP | 2001105696 A | * | 4/2001 |

* cited by examiner

*Primary Examiner*—Abdelmoniem Elamin
(74) *Attorney, Agent, or Firm*—Oliff & Berridge, LLC

(57) ABSTRACT

A controller includes a first memory of non-volatile that stores a program; a processor that executes the program; and a second memory that provides a work area for the processor. In this controller, the processor executes the program read from the first memory and stored in the second memory as a first mode, and executes the program stored in the first memory as a second mode.

3 Claims, 9 Drawing Sheets

CONTROLLER, IMAGE PROCESSING APPARATUS, AND METHOD OF CONTROLLING EXECUTION OF PROGRAM

BACKGROUND OF THE INVENTION

1. Field of the Invention

The present invention generally relates to a processor that executes programs, and more particularly, to a processor that can be employed in an image processing apparatus such as a printer, a copying machine, or a combination printing, copying, and facsimile machine. The present invention also relates to control operations performed when an image processing device shifts from a power saving mode to a normal operation mode.

2. Description of the Related Art

In recent years, various techniques have been employed to reduce power consumptions in image processing apparatuses which are, for example, facsimile machines, printers, and copying machines. There have been not only techniques of reducing the power consumptions of print engines, but also a technique of lowering or completely stopping the clock frequency of a circuit such as an ASIC (Application Specific Integrated Circuit), and a technique of cutting off power supply to parts such as an image memory and the ASIC that are not required to operate in a power saving mode.

Besides, it is known that an attempt to speed up data processing when an image processing apparatus such as a facsimile machine, a printer and a copying machine shifts from a power saving mode to a normal operation mode. One of the most common techniques is a method in which a program is copied from a ROM (Read Only Memory) that requires a long access time into a RAM (Random Access Memory) that requires a short access time, so that the CPU in the controller reads the program from the RAM to perform a high-speed operation.

However, the amount of data to be written in a ROM has been rapidly increasing in recent years, and the program copying from a ROM to a RAM is too time-consuming in accordance with the above method in which a program is copied from the ROM into the RAM, and the CPU reads the program from the RAM. Therefore, it is difficult to shorten the time required to return to the normal operation mode.

In an image processing apparatus such as a printer or a copying machine, the control panel does not indicate any message while a program is being copied from the ROM into the RAM, even when the power switch is on. This may cause inconvenience to each user of the apparatus.

SUMMARY OF THE INVENTION

The present invention has been made in view of the above circumstances and has an object to overcome the above problems and to provide a controller, an image processing apparatus, and a method of controlling execution of a program.

According to one aspect of the present invention, there is provided a controller comprising: a non-volatile first memory that stores a program; a processor that executes the program; and a second memory that provides a work area for the processor, wherein the processor executes the program read from the first memory and stored in the second memory as a first mode, and executes the program stored in the first memory as a second mode.

According to another aspect of the present invention, there is provided an image processing apparatus comprising: a print engine; and a controller that controls the print engine, the controller including: a non-volatile first memory that stores a program; a processor that executes the program; and a second memory that provides a work area for the processor, wherein the processor executes the program read from the first memory and stored in the second memory as a first mode, and executes the program stored in the first memory as a second mode.

According to a further aspect of the present invention, there is provided a method of controlling execution of a program, comprising the steps of: reading the program from a non-volatile first memory and storing the program in a second memory that provides a work area for a processor; reading the program from the first memory and executing the program; reading the program from the second memory and executing the program; and determining whether to read the program from the first memory or the second memory.

BRIEF DESCRIPTION OF THE DRAWINGS

Preferred embodiments of the present invention will be described in detail based on the following figures, wherein:

FIGS. 6A and 6B are flowcharts showing operation procedures to be carried out when the power is switched on.

DESCRIPTION OF THE PREFERRED EMBODIMENTS

Figure 1:
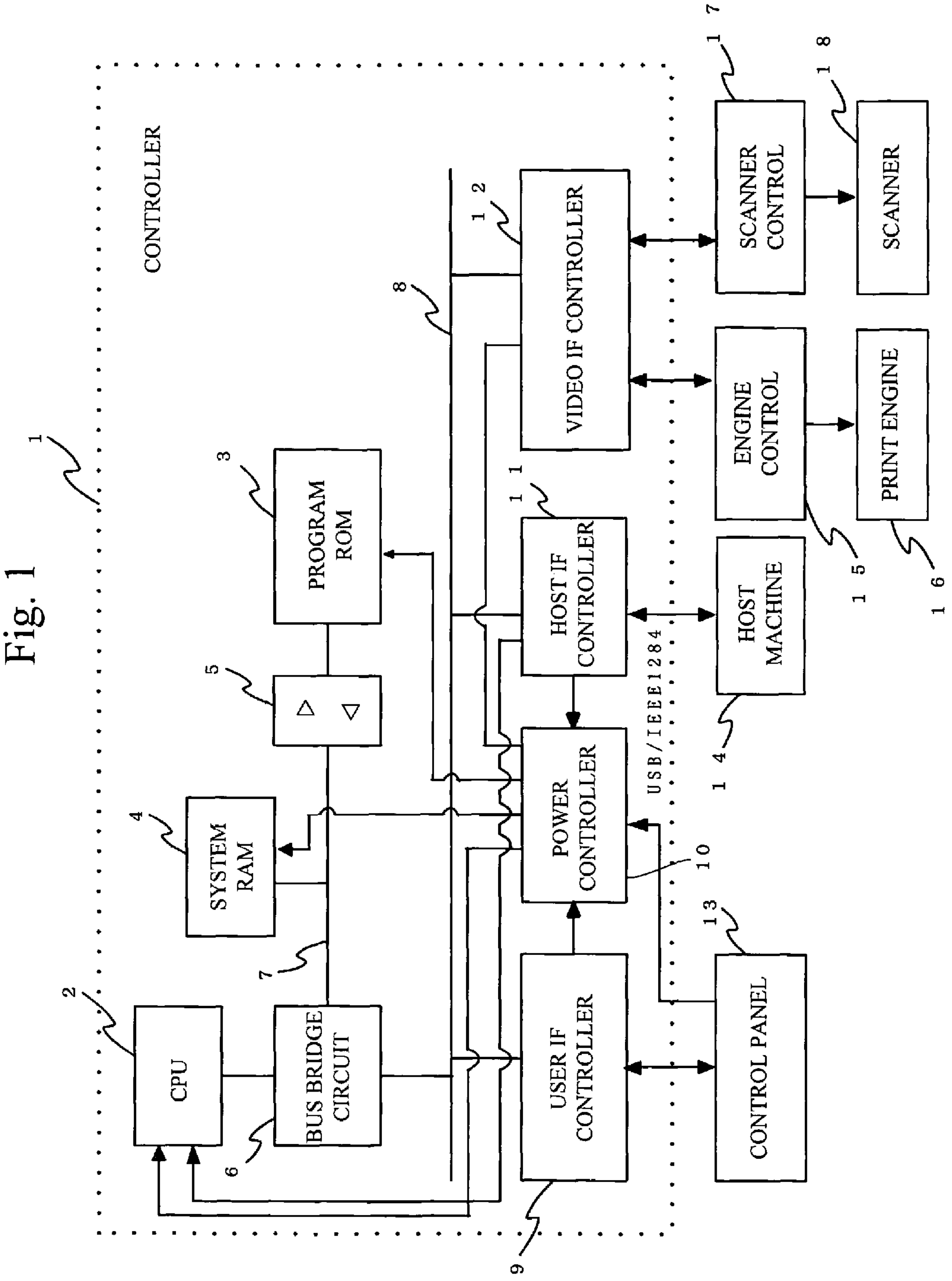
FIG. 1 is a block diagram illustrating the structure of a controller in accordance with an embodiment of the present invention.

The following is a description of embodiments of the present invention, with reference to the accompanying drawings.

First, some embodiments of the present invention will be outlined below.

A controller of an embodiment includes: a non-volatile first memory (3) that stores a program; a processor (2) that executes the program; and a second memory (4) that provides a work area for the processor. The processor operates in a first mode to read and execute the program that has been read from the first memory and stored in the second memory, and in a second mode to read and execute the program that has been stored in the first memory. Since the processor has the second mode in which the program is directly read from the first memory and is executed, the processor does not need the time it takes to read the program from the first memory to the second memory. This reduces the time necessary to execute the program. Execution of the program includes execution of a program necessary for the processor to become operable and execution of a program for realizing a job instructed from the outside of the controller.

When the processor (2) does not performing the program read out of the first memory over a predetermined period of time, the processor reads the program out of the first memory and writes the program in the second memory. Then, the processor then enters the second mode. This allows the program to be transferred to the second memory during the processor idle time. The second memory can operate at a comparatively high speed because it serves as a work area for the processor. Thus, after the program is transferred to the second memory, the processor can execute the program in the first mode, so that the program can be initiated quickly.

The processor enters the second mode when there is a change in the condition of the controller. After completing an operation in the second mode, the processor executes the program in the first mode. An example of such a change is such that the controller or a processing apparatus that includes the processor changes from a power saving mode to a normal operation or regular mode. Even in the power saving mode, the first memory is non-volatile, and keeps the program. Thus, even when the program has not been stored in the second memory in the power saving mode, the program can be read from the first memory without being written into the second memory, and can be executed directly. Thus, the time it takes to initiate execution of the program can be reduced.

The processor may determine whether to read the program from the first memory or the second memory, in accordance with the condition of the controller. The program is available from either the first memory or the second memory. This contributes to speeding up execution of the program.

The processor may execute the program in the second mode when returning from a power saving mode to a normal operation mode. Even when the contents of the second memory have been lost in the power saving mode, the program is available from the first memory. Thus, the processor surely boot up quickly.

The processor may execute the program in the second mode at a start of power supply, and the processor may execute the program in the first mode after the controller is activated. When a supply of power is started, the program is read out of the first memory and is executed by the processor without being written into the second memory. Thus, the program can be executed quickly even in power on.

The processor may execute the program in the second mode upon receipt of a predetermined instruction from outside. The operation mode can be specified outside of the processor. For instance, when the processor receives an external instruction that shows releasing from the power saving mode and returning to the normal operation mode, the processor directly reads the program from the first memory and executes it. Thus, the processor or the apparatus can quickly returns to the normal mode from the power saving mode.

The processor may be configured so that the processor reads the program from the first memory and writes it into the second memory, the processor changes address information indicating a read location from which a next program is read after execution of the program from the first memory to the second memory so that the processor enters the first mode from the second mode.

Now, a further description will be given of the embodiments of the invention with reference to the accompanying drawings.

FIG. 1 illustrates the structure of a controller 1 that is to be mounted to a printer, a copying machine, or a complex device that functions as a printer, a copying machine, and a facsimile machine.

The controller of the embodiment shown in FIG. 1 is equipped with a CPU 2, a program ROM 3, a system RAM 4, a buffer 5, a bus bridge circuit 6, a user interface controller 9, a power controller 10, a host interface controller 11, and a video interface controller 12.

The program ROM 3, the system RAM 4 and the buffer 5 are arranged on a memory bus 7. The CPU 2 that executes a control program (hereinafter simply referred to as program), the program ROM 3 and the system RAM 4 communicate with each other using a function of controlling the memory bus 7 by the bus bridge circuit 6. Here, the CPU 2 serves as a processor, the program ROM 3 serves as a first memory of non-volatile type, and the system RAM 4 serves as a work area for the CPU 2.

The bus bridge circuit 6 is also connected to an I/O bus 8 to which the user interface controller 9, the host interface controller 11, the video interface controller 12 and the power controller 10 are connected. The user interface controller 9 makes an interface with an external device. The video interface controller 12 interfaces with an engine control unit 15 and a scanner control unit 17. The power controller 10 controls supplies of a clock and power.

The CPU executes processing while using the program stored in the program RAM 3 and using the system RAM 4 as the work area. Data and program in progress may be stored in the system RAM 4.

The bus bridge circuit 6 relays data between the CPU 2 and the I/O bus 8, and controls the memory bus 7 (performing transfer control when the program stored in the program ROM 3 is written in the system RAM 4).

The video interface controller 12 connected to the I/O bus 8 is connected to an engine controlling unit 15 that controls a print engine 16, and a scanner controlling unit 17 that controls a scanner 18. The video interface controller 12 outputs image data to the print engine 16 via the engine controlling unit 15, and inputs image data that has been read by the scanner 18 via the scanner controlling unit 17.

The host interface controller 11 controls the interface between the controller 1 and an external host machine such as a PC that is connected with a USB or IEEE 1284.

The user interface controller 9 controls the interface between the controller 1 and a control panel that is equipped with an LCD and ten keys.

The power controller 10 performs an operation to return from the power saving mode to the normal operation mode. More specifically, when the user interface controller 9 detects a button operation on the control panel 13, or when the host interface controller 11 detects a print instruction or the like issued from the host machine 14, the power controller 10 generates an interrupt signal to switch the CPU 2 from the power saving mode back to the normal operation mode, and inputs the interrupt signal to the CPU 2. As shown in FIG. 1, the power controller 10 is also connected to the video interface controller 12, the program ROM 3, and the system RAM 4, so as to control clock signal and power supply to the video interface controller 12, and power supply to the program ROM 3 and the system RAM 4 in the normal operation mode and the power saving mode.

The program ROM 3 may be a flash memory, a one-time PROM (Programmable Read Only Memory), or a mask ROM. The system RAM 4 is a RAM that can be accessed at high speed, such as a SDRAM (Synchronous Dynamic Random Access Memory) or a DDR-SDRAM (Double Data Rate SDRAM).

Figure 2:
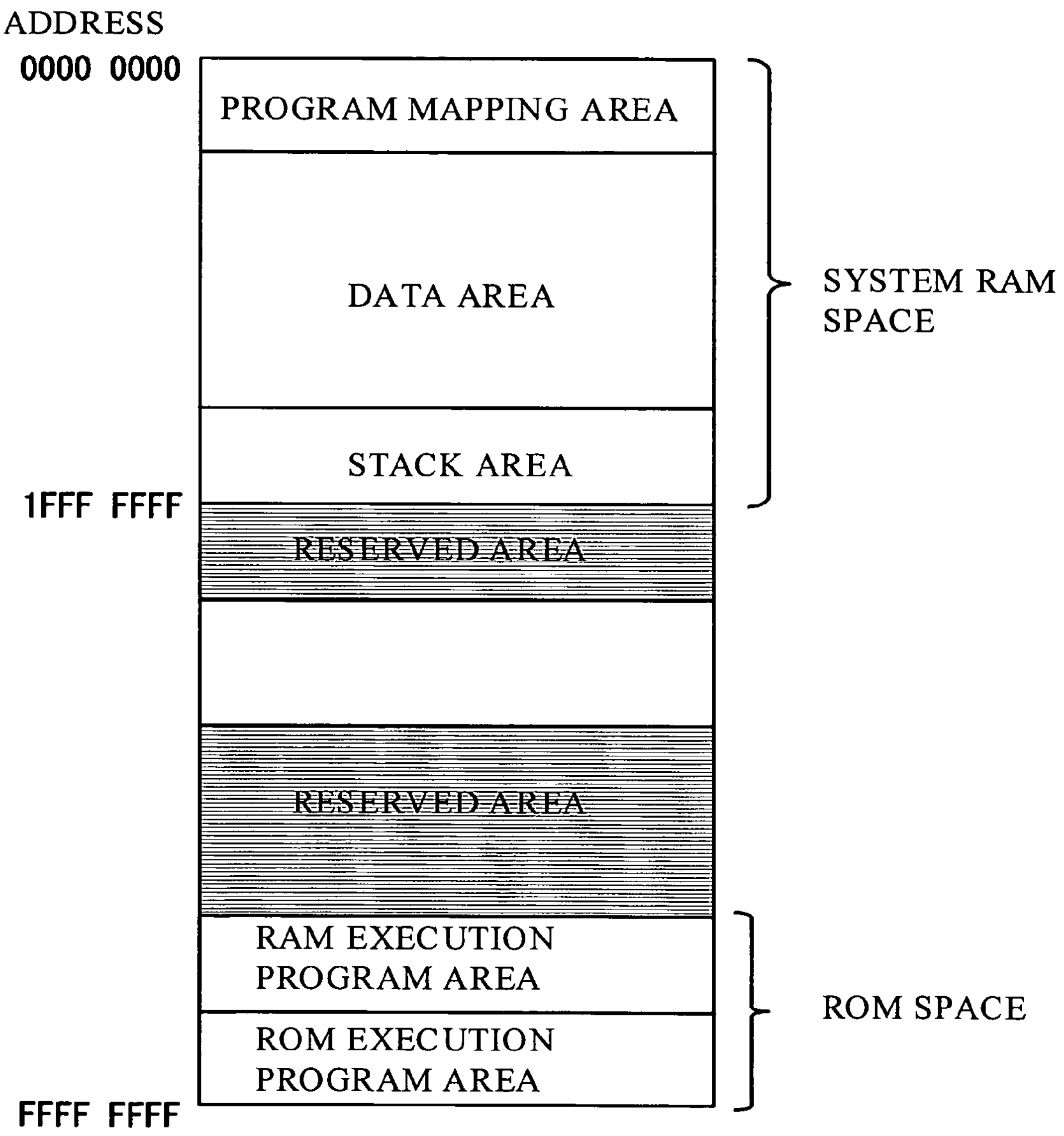
FIG. 2 shows an address map of a memory.

Now, a description will be given of an example of an address map with reference to FIG. 2. The following address and mapping of memory spaces is just one example, and the present invention is not limited thereto. The memory space prepared in the present invention shown in FIG. 2 includes a system RAM space of the system RAM 4, an I/O bus space, a ROM space for the program ROM 3, and a reserved space.

In the system RAM space, there are a program mapping area in which the program read in a RAM execution mode that will be described later, a data area for data and a stack area for storing general variables used by the program.

The I/O bus space is used to map devices connected to the I/O bus, which are, for example, a group of registers of the video interface controller 12.

The ROM space has a ROM execution program area, and a RAM execution program area. The ROM execution program area stores a program that is read directly by the CPU 2 for execution of an instruction. The RAM execution program area stores a program that is mapped in the system RAM 4 and a corresponding area of the system RAM 4 is read for execution of an instruction. That is, address information is generated so that the program in the RAM execution program area should be mapped therein.

The ROM execution program is stored in a relatively high-speed non-volatile memory that can be random-accessed, such as a NOR type flash memory because it is read directly the CPU 2 for execution. In contrast, the area for storage of the RAM execution program is not read directly by the CPU 2 but is mapped in the system RAM 4 from which the program is read for execution. Thus, a NAND type flash memory may be used to store the RAM execution program. This type of flash memory is less expensive for the same memory capacity as that of the NOR type flash memory. The RAM execution program may be compressed so that it can be stored in a memory having a reduced capacity. The controller 1 shown in FIG. 1 simply employs the program ROM 3 as the non-volatile storage medium for storing the programs without strictly giving the above-mentioned distinction.

This embodiment having the above described structure operates in the normal operation mode and the power saving mode, and more characteristically, operates in a ROM execution mode in which the CPU 2 reads a program from the program ROM 3 and executes the program, and in a RAM execution mode in which the CPU 2 reads a program from the system RAM 4, which can be accessed more quickly, and then executes the program. In this specification, the RAM execution mode will be also referred to as the “first mode”, and the ROM execution mode will be also referred to as the “second mode”.

In the normal operation mode, a program to be executed by the CPU 2 is transferred to the system RAM 4 (such as a SDRAM), which requires a shorter access time, and the CPU 2 performs a high-speed operation by executing the program stored in the system RAM 4 (“RAM execution).

If there are no image processing data to be processed by the CPU 2, such as data to be printed out or data to be copied, the controller 1 shifts from the normal operation mode to the power saving mode. In the power saving mode, the controller 1 switches off the power sources of the video interface controller 12, the program ROM 3, and the system RAM 4. As for the video interface controller 12 in the power saving mode, the controller 1 may also stop the clock supply or internally disable a clock signal. The CPU 2 also enters a predetermined power saving mode to reduce power consumption. Table 1 shows the condition of each unit in the power saving mode.

TABLE 1

| Unit in controller | Normal operation state | Power saving state |
|---|---|---|
| CPU | power on | power on/power saving mode |
| bus bridge | power on | power on/power saving mode |
| system RAM | power on | power off |
| program ROM | power on | power off |

TABLE 1-continued

| Unit in controller | Normal operation state | Power saving state |
|---|---|---|
| UI controller | power on | power off |
| host I/F controller | power on | power on |
| video I/F controller | power on | power off |
| power controller | power on | power on |

Figure 3:
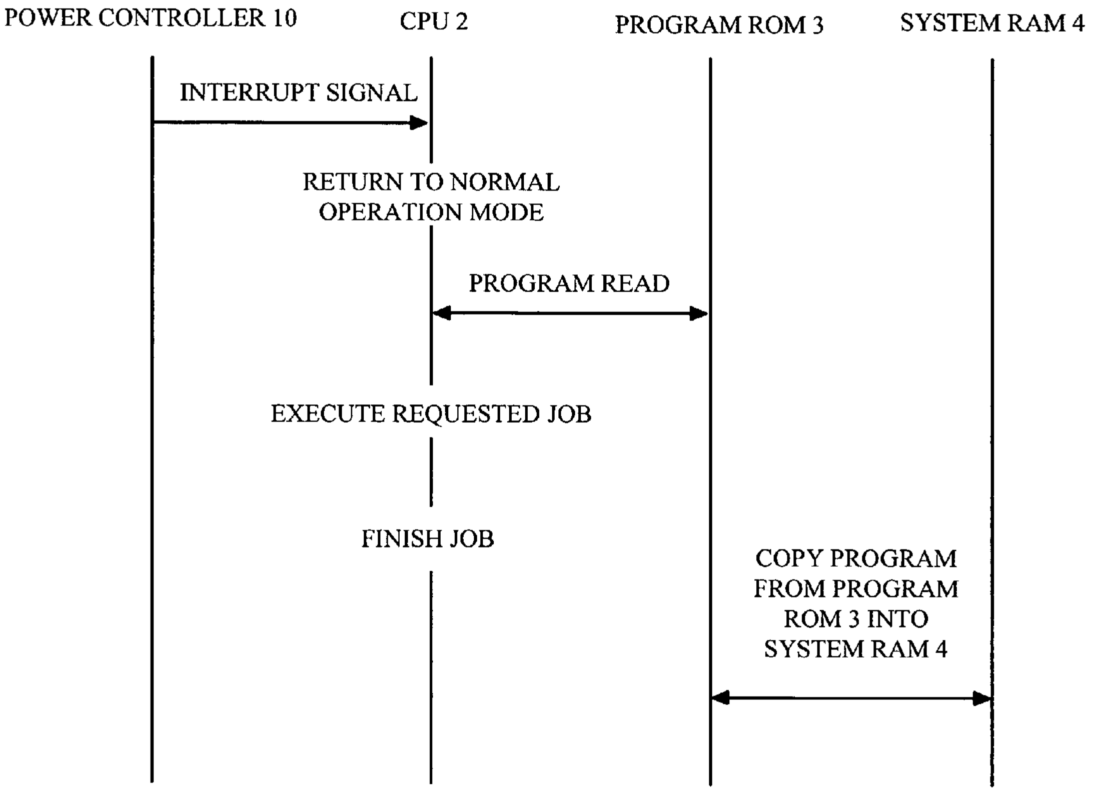
FIG. 3 is a sequence diagram showing operation procedures to be carried out by the components of the controller.

This embodiment is aimed at shortening the period of time required to return from the power saving mode (the period of time since a request such as a print request is sent to the image processing apparatus, and until the image processing apparatus is enabled). Accordingly, when an operation instruction is input through the control panel 13 and a print request is received from the external host machine 14, an interrupt signal is generated from the power controller, and is input to the CPU 2, as shown in FIG. 3. Upon receipt of the interrupt signal from the power controller 10, the CPU 2 shifts from the power saving mode to the normal operation mode, and reads the program from the program ROM 3 to carry out the requested job. When returning from a conventional power saving mode, the CPU 2 reads the program from the system RAM 4 only after the program is copied from the program ROM 3 into the system RAM 4. As a result, the CPU 2 cannot start the operation until the program copying from the program ROM 3 into the system RAM 4 is completed. In this embodiment, on the other hand, the CPU 2 reads the program directly from the program ROM 3, so that the time required to start the operation can be shortened.

In a case where the CPU 2 has not performed an operation in accordance with the program read from the program ROM 3 over a predetermined period of time, the program is copied from the program ROM 3 into the system RAM 4, as shown in FIG. 3. The CPU 2 then reads the program from the system RAM 4.

Accordingly, it is possible to promptly start a required operation by reading the program from the program ROM 3 when a swift response from the apparatus is required at such a time as the start of power supply or a return from the power saving mode to the normal operation mode. In a case where there has not been an operation performed over a predetermined period of time, the program stored in the program ROM 3 is written in the system RAM 4 which the CPU 2 can access at a high speed, so that the processing ability and performance of the CPU 2 can be improved.

Figure 4A:
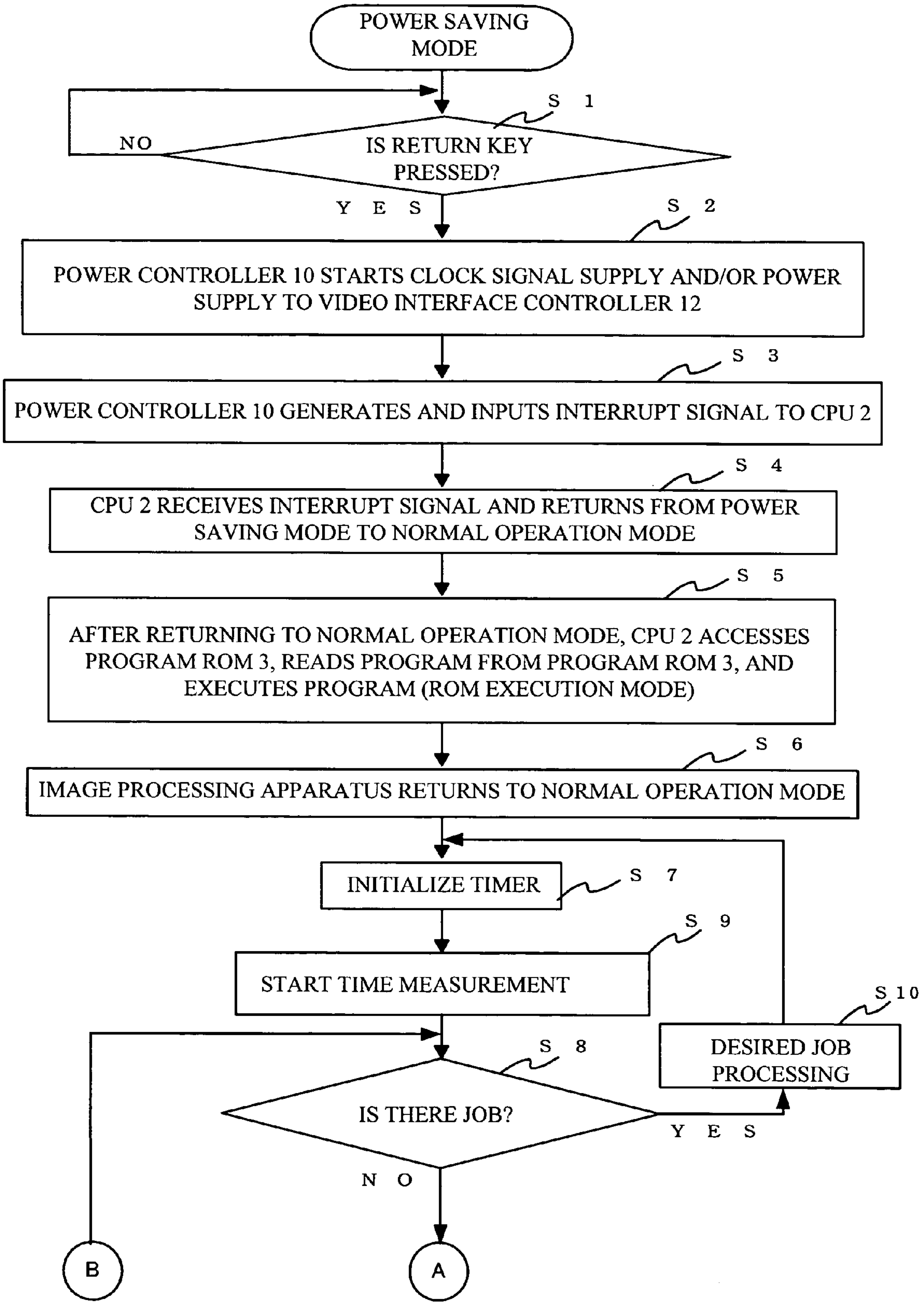
FIGS. 4A and 4B are flowcharts showing the operation procedures to be carried out to switch the operation mode from the power saving mode to the normal operation mode when a button on the control panel is pressed.
Figure 4B:
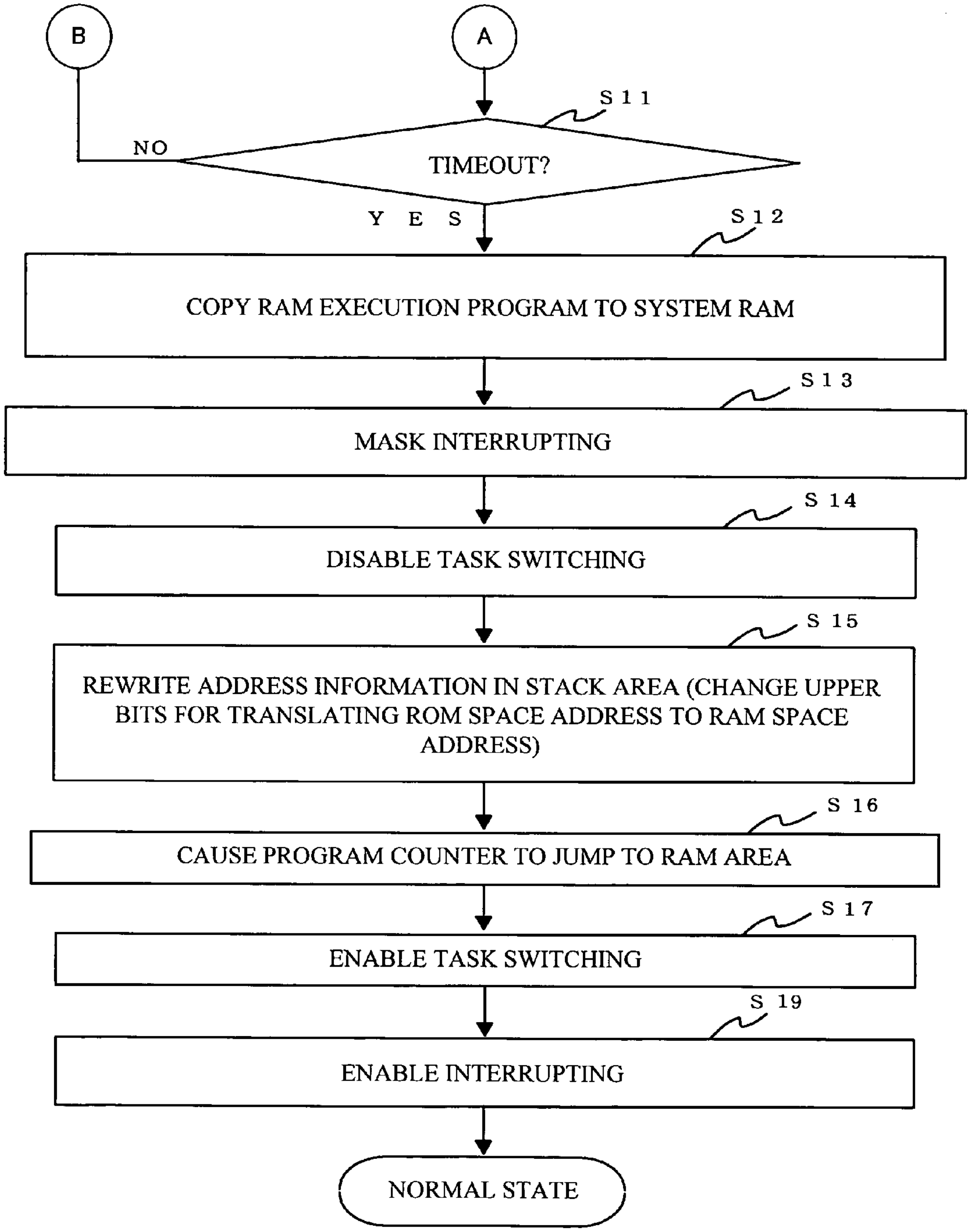

Referring now to the flowcharts of FIGS. 4A and 4B, the process of switching the image processing apparatus from the power saving mode back to the normal operation mode by operating the control panel 13 will be described.

When a user presses the switch button on the control panel 13 to switch the operation mode from the power saving mode to the normal operation mode (“YES” in step S1), the power controller 10 detects the input through the button. The power controller 10 executes a process for returning to the normal operation mode from the power saving mode in response to detection of the button.

In a case where clock supply to the video interface controller 12 has been suspended, the power controller 10 resumes clock supply to the video interface controller 12. In a case where power supply to the video interface controller 12 has been suspended, the power controller 10 resumes power supply to the video interface controller 12. Normally, an FET partially controls switching on and off of a circuit, and the power controller 10 controls the FET for switching on the power sources (step S2). At the same time, the power controller 10 resumes power supply to the program ROM 3 and the system RAM 4, so as to cancel the power saving mode of the program ROM 3 and the system RAM 4 (step S2).

The power controller 10 generates an interrupt signal to switch the CPU 2 from the power saving mode back to the normal operation mode, and inputs the interrupt signal to the CPU 2 (step S3). When the CPU 2 receives the interrupt signal, the CPU 2 jumps to a given address (generally referred to as interrupt vector). The interrupt vector may be mapped in the ROM space or the RAM space in accordance with the setting of an associated register in the CPU 2. In the present embodiment, the interrupt register is mapped in the ROM space when the mode shifts to the power saving mode.

So as to return from the power saving mode to the normal operation mode (step S4), the CPU 2 first accesses the program ROM 3 located on the memory bus 7, and then reads the program from the program ROM 3 and executes the program (ROM execution mode) (step S5).

After returning to the normal operation mode (step S6), the CPU 2 initializes the timer (step S7) to start time measurement in the ROM execution mode (step S8), and watches whether a job instruction from the user is issued during a given period of time (step S9). If a job instruction is received ("YES" in step S9), the CPU 2 starts processing under the control of the program read from the program ROM 3 (step S10). The CPU 2 executes image processing instructed by the user, such as an image copying operation. Then the CPU 2 outputs image data to the print engine 16 in synchronism with the video clock. The print engine 16 then prints out the image data, and the image copying operation comes to an end. If a subsequent job is issued during the given period ("NO" in step S11 and "YES" in step S9), the CPU 2 executes processing instructed by the subsequent job (step S10), and repeatedly executes the processing until no job is received ("NO" in step S9 and "YES" in step S11). The return address required by the function executed by the CPU 2 in the sequential processing operations pushed (arranged) in the stack area in the system RAM space. In a case where the processing operation is executed by the program read from the program ROM 3, the return address is pushed (arranged) in the stack area in the ROM space.

If there is not a request for the next image processing operation during the given period after the end of an operation ("NO" in step S9 and "YES" in step S11), the CPU 2 copies RAM execution program data from the program ROM 3 to the system RAM 4 (step S12). The transfer of the program from the program ROM 3 to the system RAM 4 may be controlled so that the CPU 2 reads the program and writes it into the system RAM 4 or the DMA function in the bus bridge circuit 6 may be used. In a case the RAM execution program is compressed and stored, it should be expanded to write the resultant original into the system RAM 4. At the time when copying of the program data to the system RAM 4 is finished, the CPU 2 masks any interrupting (step S13), and inhibits task switching (step S14). The ordinary OS has a command of disabling task switching as a function of the OS. Thereafter, the return address for the function pushed (arranged) in the stack area is translated from the ROM space to the system RAM (step S15). If the execution program in the ROM execution program area and the RAM execution program mapped in the program execution area in the system RAM space are designed to have the same lower-bit address, translation of the return address from the ROM space to the system space may be implemented by merely changing the upper address bits. Thereafter, the CPU 2 causes the program counter to jump to the system RAM space in response to a jump instruction (step S16). The CPU 2 enables task switching (step S17) and interrupting (step S18), and reaches the RAM execution mode. After the program is written into the system RAM 4, unnecessary power supply to the program ROM3 is shut off. This contributes to saving power.

Figure 5A:
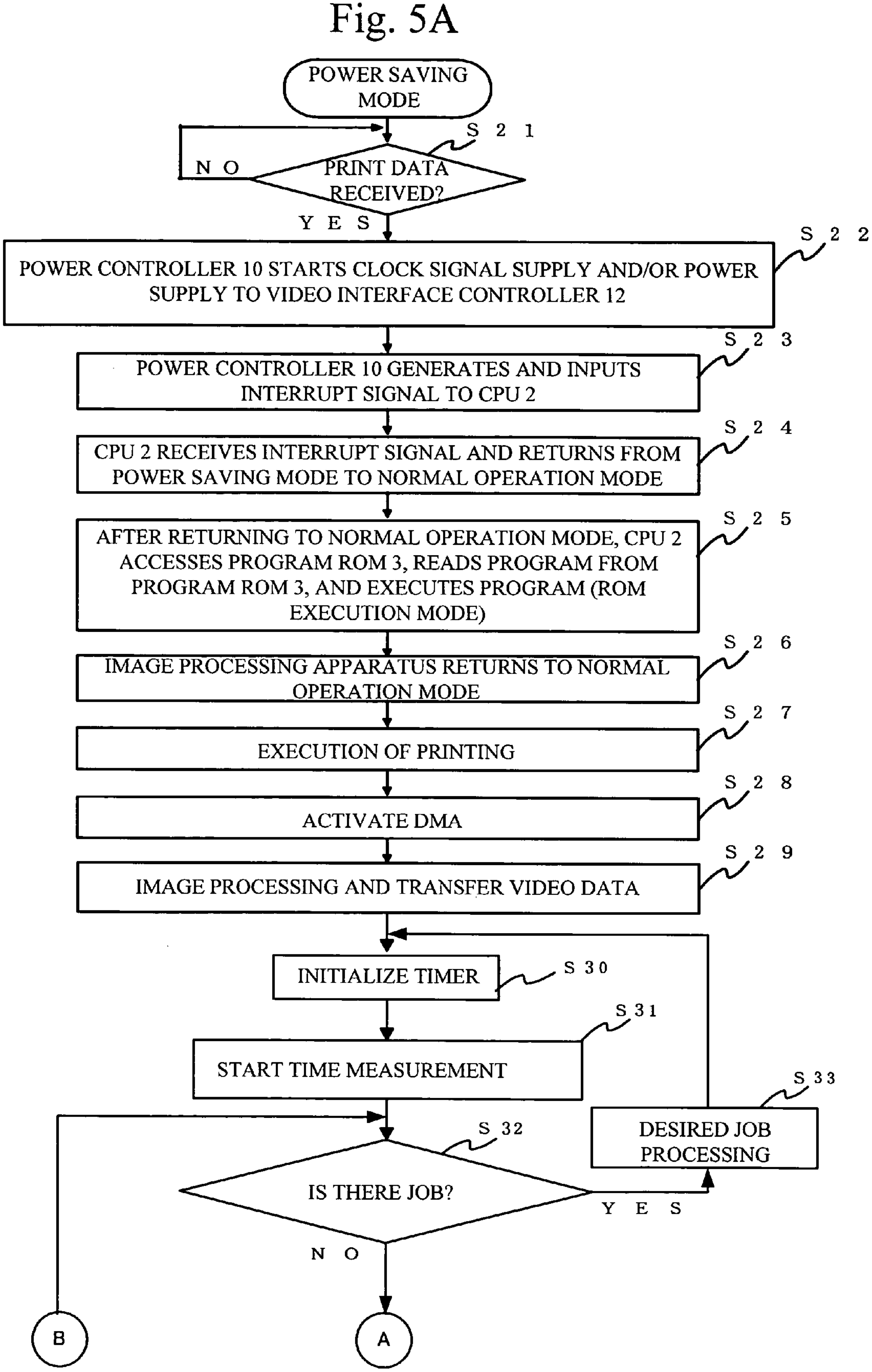
FIGS. 5A and 5B are flowcharts showing the operation procedures to be carried out to switch the operation mode from the power saving mode to the normal operation mode when there is a request for print from an external host machine.
Figure 5B:
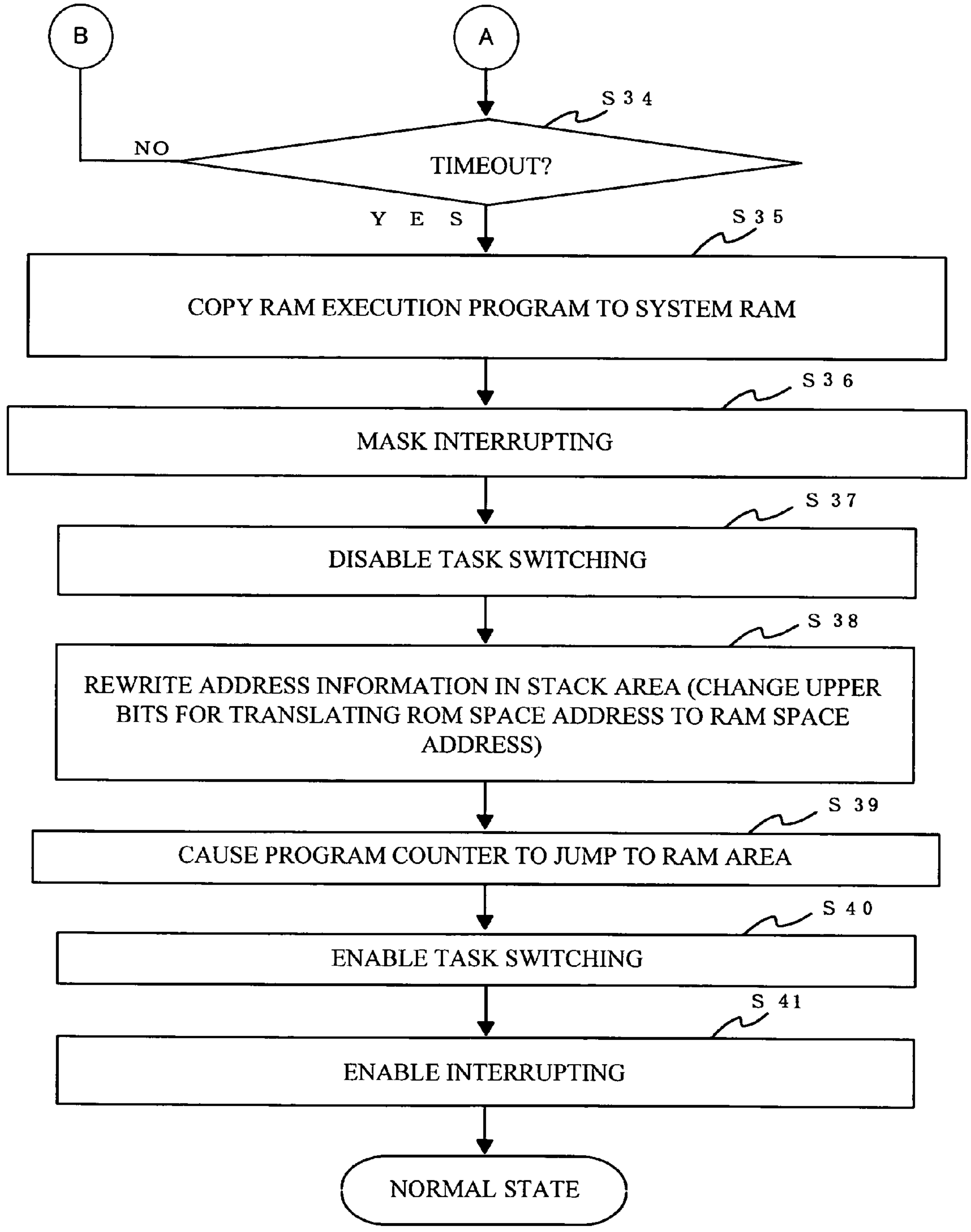

Referring next to the flowcharts of FIGS. 5A and 5B, the process of switching the image processing apparatus from the power saving mode back to the normal operation mode in accordance with a print instruction from an external host device will be described.

If a print instruction is input from the external host machine 14 such as a personal computer via a USB interface or the like ("YES" in step S21), the host interface controller 11 detects the print instruction, and reports the print instruction to the power controller 10. Upon receipt of the notification from the host interface controller 11, the power controller 10 performs an operation to switch the image processing apparatus from the power saving mode to the normal operation mode.

The procedures to be carried out by the power controller 10 in this operation are substantially the same as those in the operation in accordance with the instruction input through the switch button on the control panel 13, and therefore, explanation of them will be simplified below. The power controller 10 resumes clock signal and power supply to the video interface controller 12, and power supply to the program ROM 3 and the system RAM 4 (step S22). The power controller 10 inputs an interrupt signal to the CPU 2 to return from the power saving mode (step S23). In this operation, the host interface controller 11 also inputs an interrupt signal for print data reception to the CPU 2. The host interface controller 11 includes a memory such as a FIFO (First In First Out) memory to temporarily store data to be printed out, and a DMA (Direct Memory Access) controller to transfer received data to the system RAM 4 on the memory bus 7.

So as to return from the power saving mode to the normal operation mode (step S24), the CPU 2 first accesses the program ROM 3 located on the memory bus 7, and reads the program from the program ROM 3 and executes the program (ROM execution mode) (step S25).

After returning to the normal operation mode (step S26), the CPU 2 starts an operation in accordance with the program read from the program ROM 3 (step S27) . The CPU 2 recognizes an interrupt signal for print data reception from the host interface controller 11, and sets the address of the system RAM 4, which is the transfer destination, in the control register of the DMA controller in the host interface controller 11. After that, the DMA is activated (step S28).

The CPU 2 then converts the print instruction data transferred to the system RAM 4 into image data, and stores the image data in the system RAM 4. The CPU 2 also activates the DMA controller in the video interface controller 12, so as to transfer the image data from the system RAM 4 to the video interface controller 12. The video interface controller 12 outputs the image data to the print engine 16 in synchronization with a video clock. The print engine 16 then prints out the image data, and ends the print operation. If an instruction for the next print operation is input successively, a predetermined operation is performed and completed (step S29).

The CPU 2 initializes the timer (step S30) to start time measurement (step S31), and watches whether a job instruction is issued from the user during the given period of time (step S32). If a job instruction from the user is received ("YES" in step S32), the CPU 2 starts processing by the program read from the program ROM 3 (step S33). This is repeatedly carried out until timeout of the given period (step S34).

When the processing operation is finished and the given period comes to timeout ("YES" in step S34), the CPU 2 switches the program execution mode from the ROM execution mode to the RAM execution mode in the same sequence as mentioned before (steps S35-S41). After the program is completely written into the system RAM 4, unnecessary power supply to the program ROM 3 is shut off. This contributes to saving power.

Since the time required to access a RAM is normally shorter than the time required to access a ROM, the program execution time is greatly shortened after the program execution mode is switched from the ROM execution mode to the RAM execution mode.

Figure 6A:
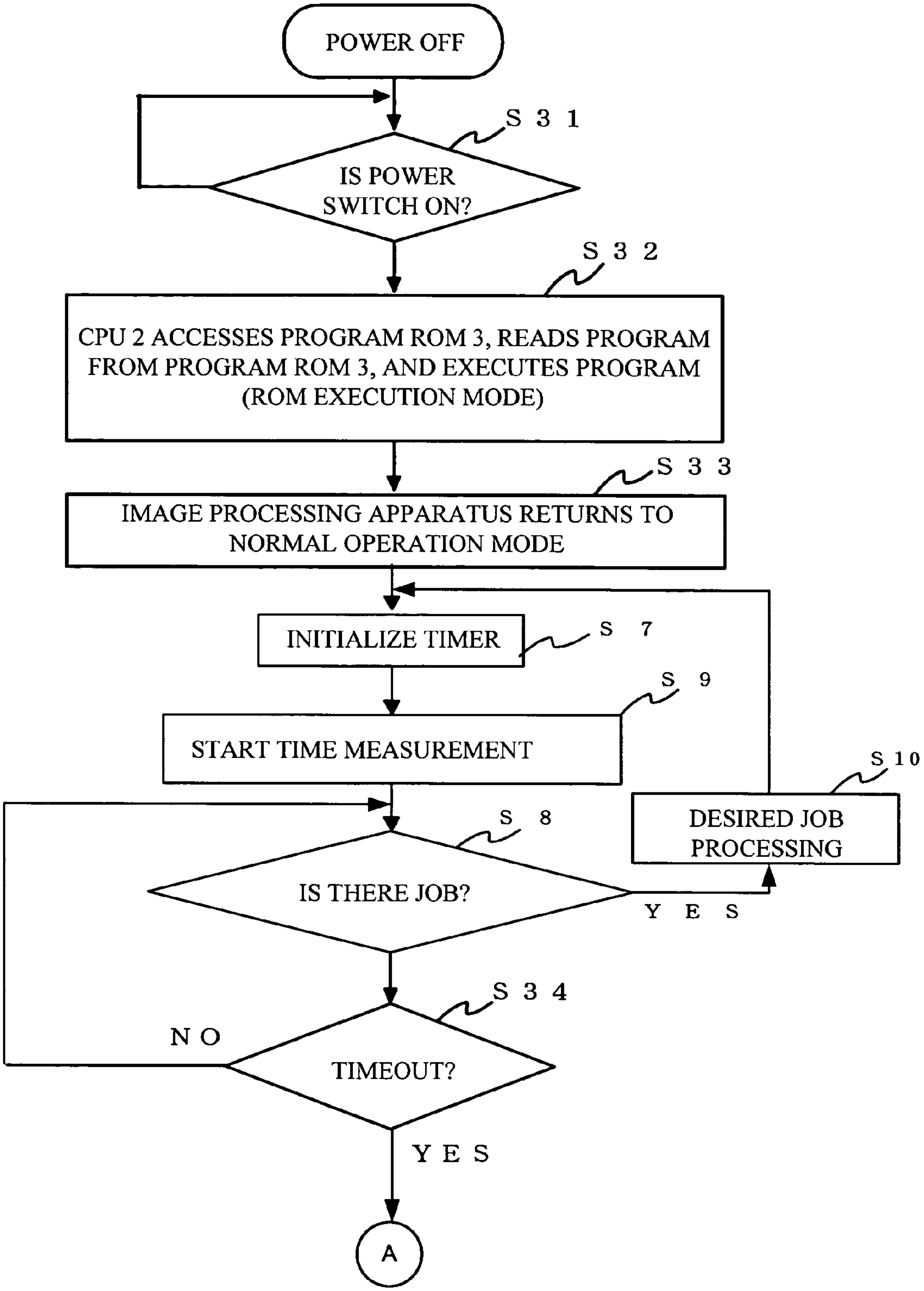
Figure 6B:
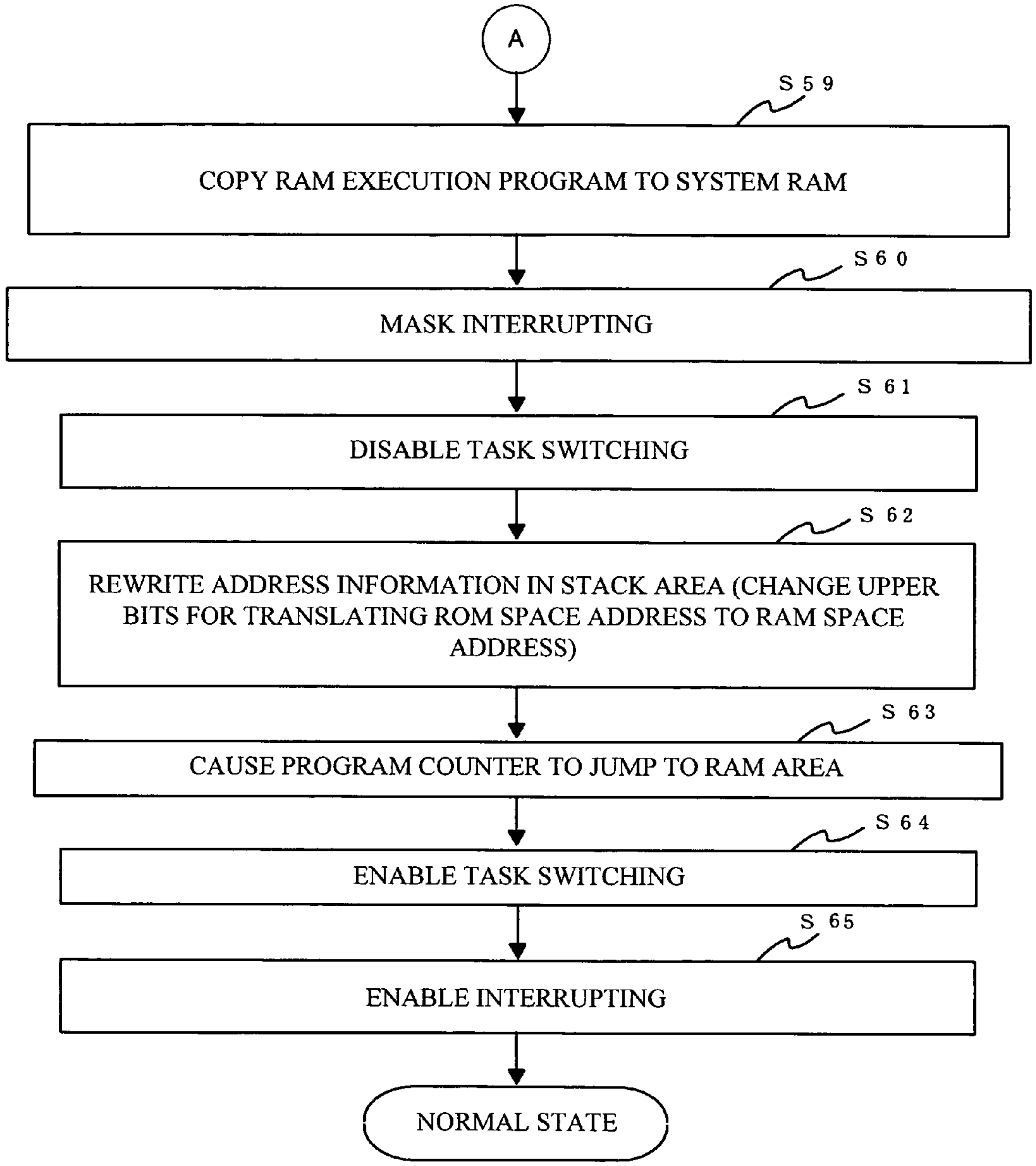

Although the above procedures are carried out to return from the power saving mode to the normal operation mode, the same procedures as above can be carried out to switch on the power source of the image processing apparatus. Referring now to FIGS. 6A and 6B, these procedures will be described in detail.

After the power source of the image processing apparatus is switched on ("YES" in step 51), the CPU 2 accesses the program ROM 3 (step S52), and executes a boot program stored in the program ROM 3 so as to enter the normal operation mode (step S53).

The CPU 2 initializes the timer (step S54) to start time measurement (step S55), and watches whether a job instruction is issued from the user during the given period of time (step S56). If a job instruction from the user is received ("YES" in step S56), the CPU 2 starts processing by the program read from the program ROM 3 (step S57). This is repeatedly carried out until timeout of the given period (step S58).

When the processing operation is finished and the given period comes to timeout ("YES" in step S58), the CPU 2 switches the program execution mode from the ROM execution mode to the RAM execution mode in the same sequence as mentioned before (steps S59-S65). After the program is completely written into the system RAM 4, unnecessary power supply to the program ROM 3 is shut off. This contributes to saving power.

In this manner, when shifting from the power saving mode to the normal operation mode, the CPU 2 reads a program from the program ROM 3 so as to control the apparatus in this embodiment. As the CPU 2 reads the program directly from the program ROM 3, there is no waste of time due to the operation of copying the program from the program ROM 3 into the system RAM 4, and the time required to start a desired data processing operation can be shortened accordingly. In this manner, it is possible to start promptly a requested operation by reading a program directly from the program ROM 3, when a quick response from the apparatus is required at such a time as the start of power supply or a return from the power saving mode to the normal operation mode.

In a case where the CPU 2 has not performed an operation in accordance with the program read from the program ROM 3 over a predetermined period of time, the program is copied from the program ROM 3 into the system RAM 4, and the CPU 2 reads and executes the program from the system RAM 4. Accordingly, it is possible to start a required operation by reading the program from the program ROM 3 when a quick response from the apparatus is required at such a time as a return from the power saving mode to the normal operation mode. In a case where there has not been an operation performed over a predetermined period of time, the program stored in the program ROM 3 is copied into the system 4 which the CPU 2 can access at a high speed, so that the processing ability and performance of the CPU 2 can be improved.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2003-168524 filed on Jun. 12, 2003 including specification, claims, drawings and abstract is incorporated herein by reference in its entirety.

What is claimed is:

1. A controller comprising:

a first memory of non-volatile type that stores a program;

a processor that executes the program;

a second memory that provides a work area for the processor;

a timer that measures a predetermined period of time; and a determining unit that determines whether there is a job executed by the processor, wherein the processor executes the program read from the first memory and stored in the second memory as a first mode, and executes the program stored in the first memory as a second mode, and the processor reads the program from the first memory and writes the program in the second memory when the determining unit determines that there is no job executed by the processor in the second mode for the predetermined period of time measured by the timer after the processor returns to a normal mode from a power saving mode, and then the processor executes the program in the first mode.

2. An image processing apparatus comprising:

a print engine; and a controller that controls the print engine, the controller including:

a first memory of non-volatile type that stores a program;

a processor that executes the program;

a second memory that provides a work area for the processor;

a timer that measures a predetermined period of time; and a determining unit that determines whether there is a job executed by the processor, wherein the processor executes the program read from the first memory and stored in the second memory as a first mode, and executes the program stored in the first memory as a second mode, and the processor reads the program from the first memory and writes the program in the second memory when the determining unit determines that there is no job executed by the processor in the second mode for the predetermined period of time measured by the timer after the processor returns to a normal mode from a power saving mode, and then the processor executes the program in the first mode mode.

3. A method of controlling execution of a program, comprising the steps of:

reading the program from a first memory of non-volatile type and storing the program in a second memory that provides a work area for a processor;

reading the program from the first memory and executing the program;

reading the program from the second memory and executing the program;

determining whether to read the program from the first memory or the second memory;

measuring a predetermined period of time;

determining whether there is a job executed by the processor;

reading the program from the first memory and writing the program in the second memory when the it is determined that there is no job executed in the second mode for the predetermined period of time after the processor returns to a normal mode from a power saving mode; and subsequently executing the program in the first mode.

* * * * *